May 2, 1933. J. SACHS 1,907,010
ELECTRIC METER SERVICE APPLIANCE
Filed April 2, 1932 4 Sheets-Sheet 1
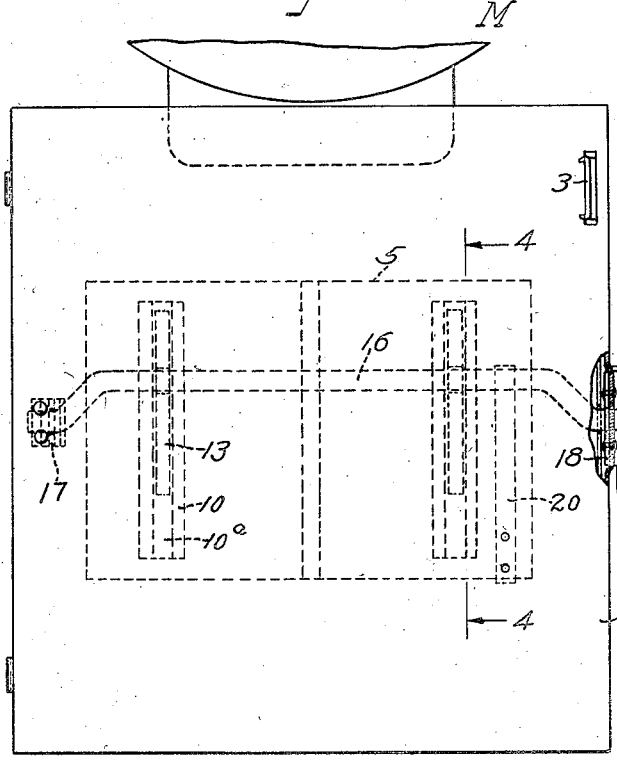
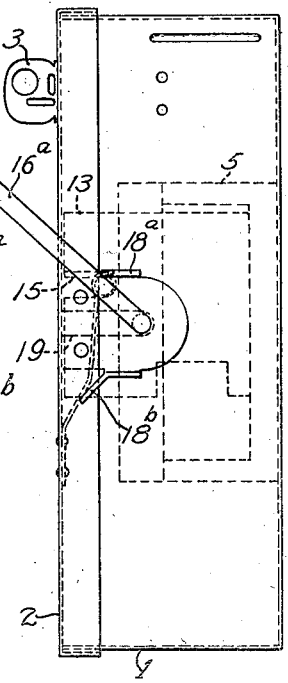
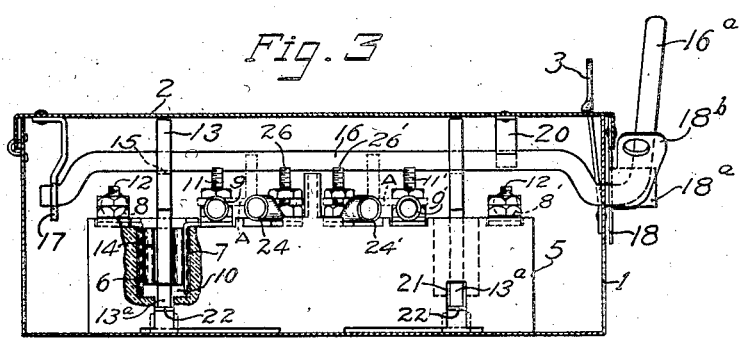
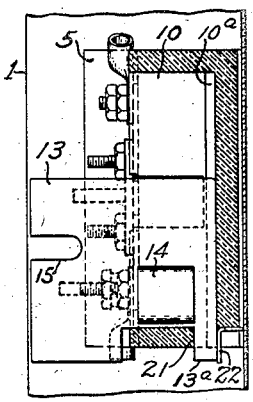
Inventor- Joseph Sachs
By S. Jay Teller
Attorney May 2, 1933.  J. SACHS  1,907,010
ELECTRIC METER SERVICE APPLIANCE
Filed April 2, 1932  4 Sheets-Sheet 2

Inventor- Joseph Sachs
By S. Jay Teller
Attorney

May 2, 1933.   J. SACHS   1,907,010
ELECTRIC METER SERVICE APPLIANCE
Filed April 2, 1932   4 Sheets-Sheet 3
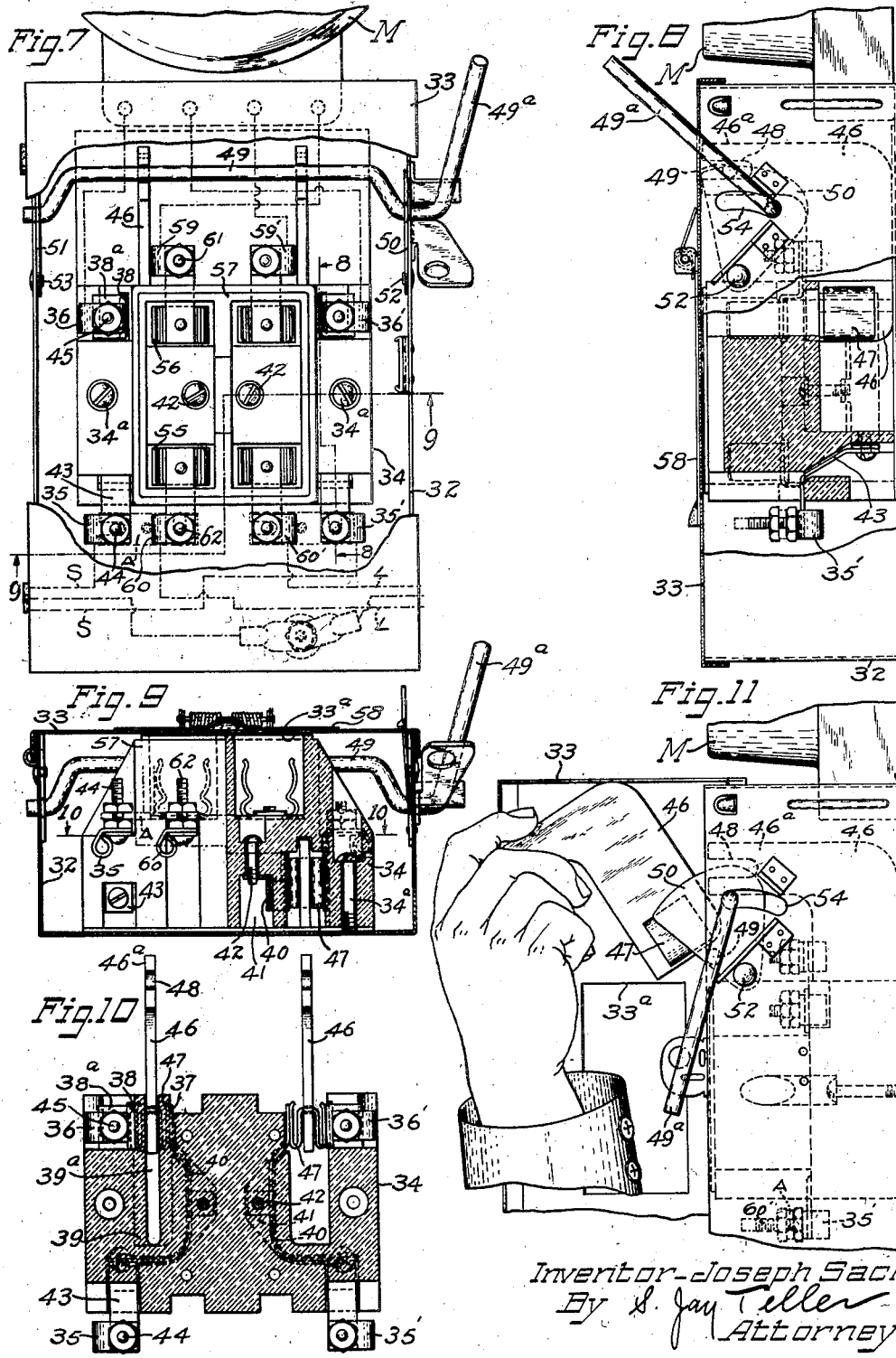

May 2, 1933.  J. SACHS  1,907,010
ELECTRIC METER SERVICE APPLIANCE
Filed April 2, 1932  4 Sheets-Sheet 4
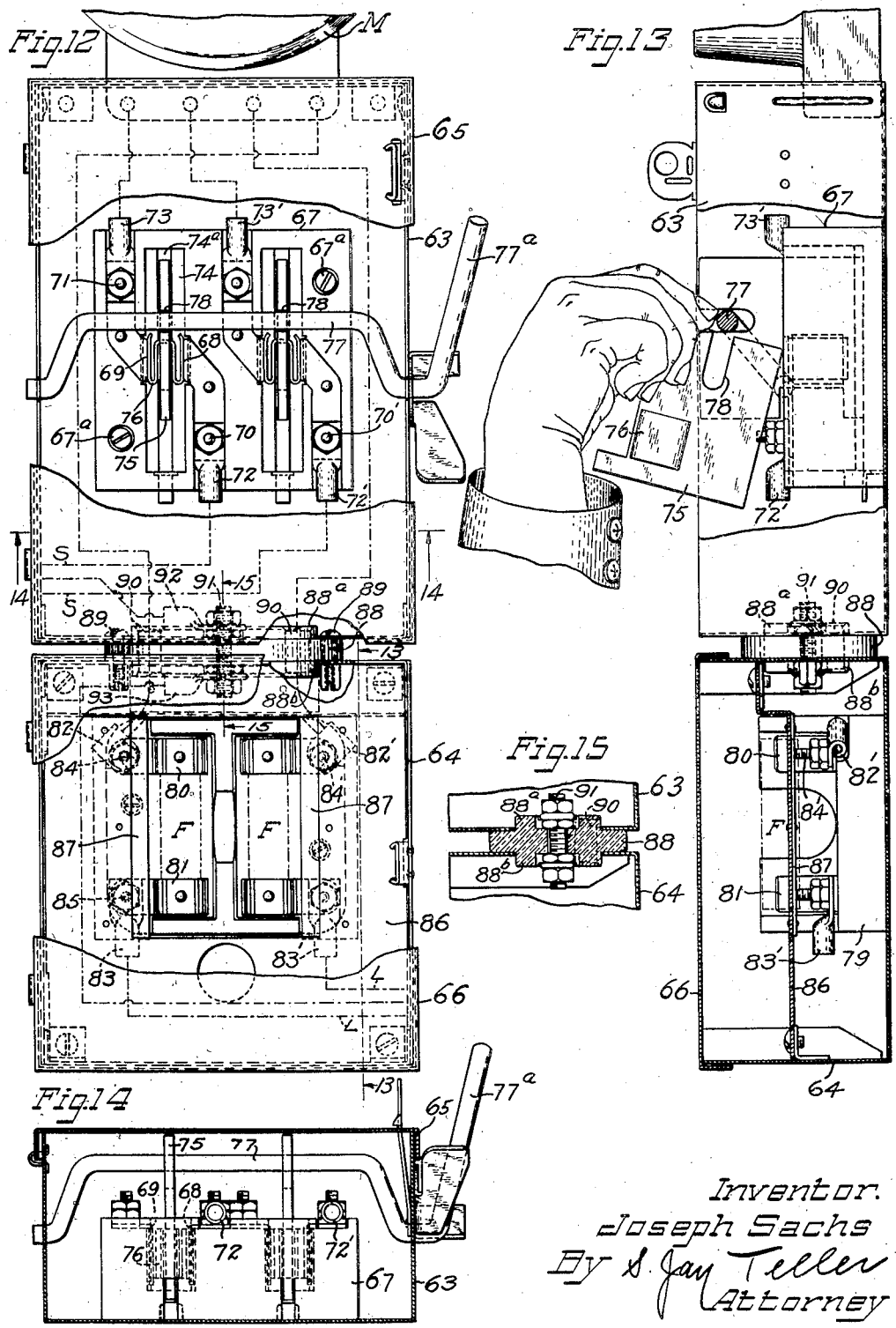
Inventor.
Joseph Sachs
By S. Jay Teller
Attorney Patented May 2, 1933

1,907,010

UNITED STATES PATENT OFFICE

JOSEPH SACHS, OF WEST HARTFORD, CONNECTICUT

ELECTRIC METER SERVICE APPLIANCE

Application filed April 2, 1932. Serial No. 602,860.

My invention relates to appurtenances and appliances providing for the control, maintenance and protection of the electric service installation including the meter. In such installations it has been customary to place, at a point in proximity to where the service wires enter the building, a switch and usually also an automatic overload protective device such as a fuse. There is also installed at this point by the service company their electric meter for recording the energy consumed. In such electric meter service installations the necessary devices and appliances have been combined in a single complete installation arrangement providing for the turning on and off of the current by the switch, the automatic protection of the service by the fuses, the testing of the meter by means of suitable arrangements of the switch and fuse parts or by the provision of additional testing facilities, and a suitable enclosure or box by means of which the aforesaid parts and also a portion of the meter are mechanically protected so as to prevent tampering and insure safety.

The general object of the present invention is to provide an electric meter service appliance which is simple, compact and inexpensive and which has its parts so arranged that the same elements or members which normally serve for switching purposes may also be manipulated independently of each other to facilitate the testing of the meter.

In attaining the advantageous results incident to the present invention I utilize the basic principle which is disclosed in my Patent No. 1,170,113 for Electric meter testing switch, dated February 1, 1916. In that patent there is disclosed an appliance of the general type referred to having a plurality of switching members normally connected to and operable by an operating member which includes a handle on the exterior of the enclosing box. The construction shown in the patent is such that any one of the switching members can be disconnected from the operating member, thus enabling the switching member so disconnected to be manually moved independently of the operating member and independently of any other switching member to break the electrical connection between the corresponding contacts and terminals. By this means any terminal of the meter may be readily disconnected from the circuit wire to which it is normally connected, and such disconnection is effected by means of the usual or ordinary switching member without the necessity for any separate test link or test switch.

In accordance with the present invention I obtain not only all of the advantageous results incident to the construction disclosed in the said patent, but I obtain numerous other advantages. With the present invention each switching member is more readily disengaged from the operating member and when so disengaged it is completely removable from the appliance. The increased convenience of disengagement is attained by a novel mechanical arrangement of parts which will be described in detail. The complete removability of each combined switching and testing member not only facilitates the work of the meter tester, but has the additional advantage that when service is to be discontinued the said switching or testing members can be entirely removed, thus making it impossible for the customer to close the switch and establish the connections therethrough even though he were to disregard the seal or other ordinary lock-off device which might be provided.

In my Patent No. 1,301,175 for Electric service and meter testing system, dated April 22, 1919, I have disclosed and claimed a meter service appliance adapted for meter testing, wherein there are circuit controlling means such as a switch connected on the service side of the meter and circuit controlling means including a fuse connected on the load side of the meter, the appliance including an enclosure which renders the service side parts inaccessible while permitting access only to the fuse and fuse contacts on the load side. The novel features of the present invention are well adapted to be combined with the advantageous features of the last said patent and two embodiments of the invention incorporating such combinations are shown and described.

It has heretofore been customary and in fact usually required in meter service installations to provide a fuse on the service side of the meter. In accordance with more recent practice the fuse on the service side of the meter may be and frequently is omitted. The omission of the fuse enables the appliance to have greater simplicity and compactness and makes it less expensive. While the present invention is not necessarily so limited it is particularly applicable to devices wherein the fuse on the service side is omitted.

In the accompanying drawings I have shown several embodiments of the invention and it will be understood that the drawings are intended for illustrative purposes only and are not to be construed as defining or limiting the scope of the invention, the claims forming a part of this specification being relied upon for that purpose.

Of the drawings:

Fig. 1 is a front view of a meter service appliance embodying the invention.

Fig. 2 is a side view.

Fig. 3 is a bottom view with the enclosing cabinet shown in transverse section.

Fig. 4 is a fragmentary vertical sectional view taken along the line 4—4 of Fig. 1.

Fig. 7 is a front view of a somewhat different meter service appliance embodying the invention, a portion of the front cover being broken away to show interior parts.

Fig. 8 is a combined side and vertical sectional view, the sectional portion of the view being taken along the line 8—8 of Fig. 7.

Fig. 9 is a horizontal sectional view taken along the line 9—9 of Fig. 7.

Fig. 10 is a vertical sectional view taken along the line 10—10 of Fig. 9.

Fig. 11 is a fragmentary side view with the cover open and with one of the switching members being removed.

Fig. 12 is a front view of a different meter service appliance embodying the invention, portions of the two front covers being broken away to more clearly show interior parts.

Fig. 13 is a vertical sectional view taken along the line 13—13 of Fig. 12.

Fig. 14 is a horizontal sectional view taken along the line 14—14 of Fig. 12.

Fig. 15 is a fragmentary vertical sectional view taken along the line 15—15 of Fig. 12.

Figure 5:
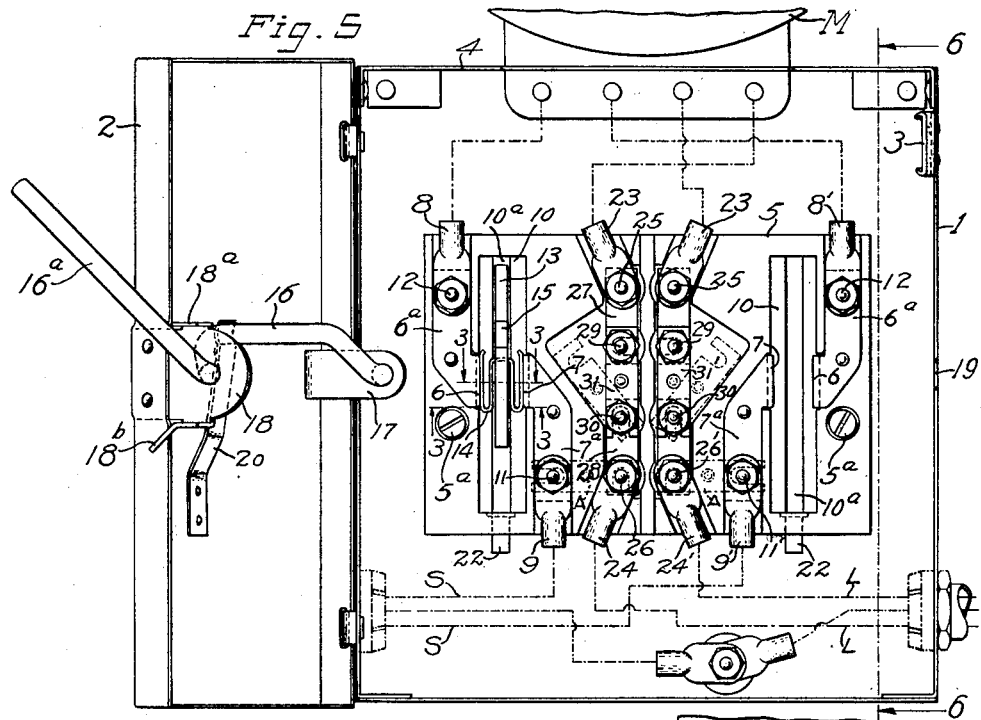
Fig. 5 is a front view with the front cover of the box in open position.

The appliance shown in detail in Figs. 1 to 6 will first be described. The appliance includes two sets of parts adapted respectively for two legs of a circuit and inasmuch as these parts are similar to each other, except for reversals of position, I shall confine myself in the main to one set of such parts, that is, those at the left.

There is provided an enclosing box 1 having an openable front cover 2 adapted to be held in closed position by means of a latch 3. The shape and size of the box may be varied according to the particular purpose for which it is to be used. The upper end wall 4 of the box is adapted for direct cooperation with the meter terminal portion of an electric meter M, the construction being such that the said portion of the meter can project into the box with a relatively close fit so as to prevent theft of current.

Positioned within the box 1 is an insulating base 5 held in place by means of screws $5^a$, $5^a$. Two stationary switch contacts 6 and 7 are mounted on the base 5 and are respectively connected with wire terminals 8 and 9. Preferably the contacts 6 and 7 are so constructed and arranged that their contact faces are opposite each other and parallel. As shown, the contacts are provided respectively with extensions $6^a$ and $7^a$ which are secured to the front of the base 5, the contacts proper projecting rearward from the front face of the base into a vertical slot 10 formed therein. As clearly shown in Fig. 3 the slot 10 is relatively wide, but is provided with a much narrower rear portion $10^a$. The terminals 8 and 9 are connected with the extensions $6^a$ and $7^a$ by means of nuts on screws 11 and 12.

Vertically movable in the slot 10 is a switching member which comprises a thin flat insulating element 13 and a conducting element 14 carried thereby. The switching member is preferably rectilinearly movable, the flat insulating element or plate thereof being guided for such movement in the narrow rear portion $10^a$ of the slot 10. The conducting element 14 of the switching member is shown as formed of sheet metal which is bent to extend through a transverse slot in the plate 13 and which is additionally bent to form two opposite contact faces adapted to engage respectively with the stationary contacts 6 and 7. The insulating plate 13 is formed with a transverse slot or notch 15 which is open at the front of the plate.

An operating member is provided for the switching members, and preferably this is a cranked member 16 mounted for movement about a transverse pivotal axis and the said member is normally so positioned that its cranked portion extends through the slot 15 in the switching member. When there are two switching members as shown the same operating member serves for both of them. The said operating member includes a handle $16^a$ located on the exterior of the box and adapted for manual operation to effect movement of the switching member or members to open or close the circuit.

The relationship between the cover, the operating member and each switching member is such that, when the cover is open and the switching members are accessible, each of them is freely movable manually independently of the operating member to break the connection between the corresponding contacts. Although each switching member is independently movable as described when the cover is open the construction is such that when the cover is closed the said cover not only prevents access to the switching member, but also serves to maintain an operative relationship between the operating member and the switching member, thus enabling the operating member to move the switching members to open or close the circuit as desired.

While the general relationship between the cover, the operating member and the switching members is as already described, considerable variation as to details of relationship is possible, one of the desirable arrangements being shown in Figs. 1 to 6. As illustrated in these figures the pivoted operating member 16 is carried by the main cover 2, there being provided on the cover rearward projecting brackets 17 and 18 which serve as bearings for the trunnions of the operating member. The bracket 17 is normally inside the box as shown in Fig. 3 and the bracket 18 is normally outside of the box and adjacent the right wall thereof. The said right wall of the box is provided with a notch 19 through which the operating member extends, this notch being open at the front so as to permit the movement of the operating member into and out of position while the cover is being closed or opened. As shown the said bracket 18 is provided with two ears 18ᵃ and 18ᵇ which serve as stops to limit the movement of the handle 16ᵃ. Preferably there is provided on the cover a spring clip 20 adapted to engage the cranked portion of the operating member to resiliently hold it either in the open-circuit position or in the closed-circuit position.

When the main cover 2 is closed the switching members 13—14 may be moved in the usual way by means of the handle 16ᵃ. With the handle in its uppermost position as shown in Figs. 1 and 2 the switching members are also in their uppermost positions and thus serve to connect the respective contacts 6 and 7 as clearly shown in Fig. 5. When the handle 16ᵃ is moved to its lowermost position the switching members are moved downward, thus breaking the circuit between the contacts of the respective pairs. It will be observed that the normal movements of the switching member are guided at the front by the front cover 2, which is in engagement or approximate engagement therewith, and are guided at the rear by the rear wall of the slot 10ᵃ in the base 5.

Figure 6:
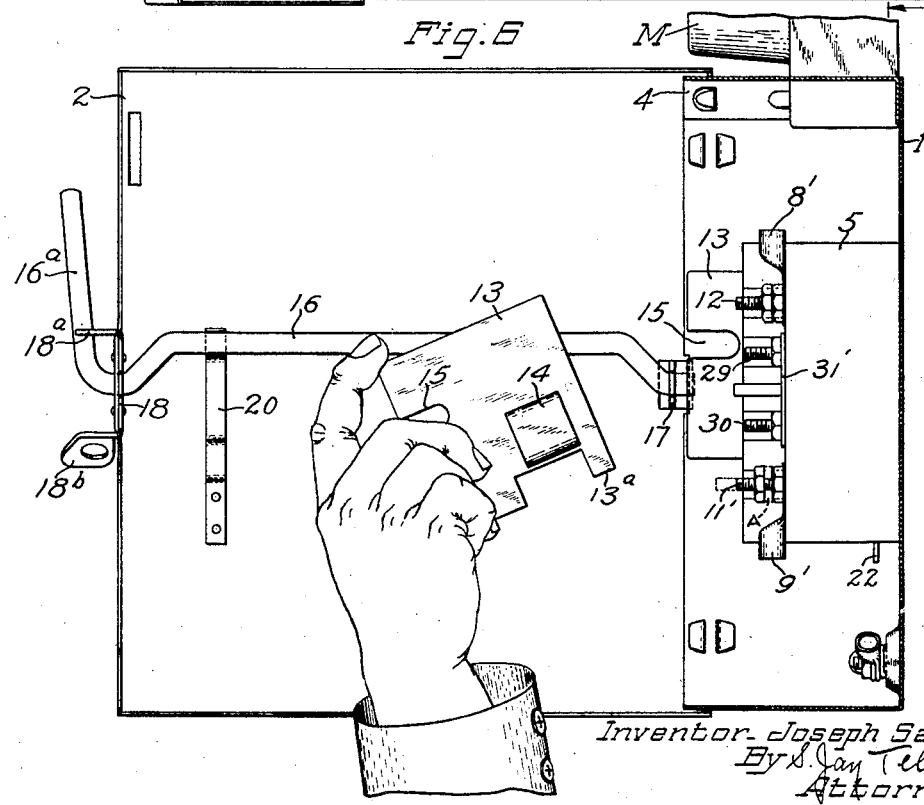
Fig. 6 is a vertical sectional view taken along the line 6—6 of Fig. 5 and showing one of the switching members being removed.

When the main cover 2 is moved to its open-position as shown in Figs. 5 and 6 the operating member 16 is withdrawn from the slots 15. If the cover is opened with the switching members in their upper positions they will be held against accidental displacement by reason of their frictional engagement with the stationary switch contacts. If the cover is opened with the switching members in their lowermost positions there would be danger of their falling out if special provision were not made to prevent it. In order to retain each switching member in its lowermost position when the cover is open the said switching member is provided with a downward extension 13ᵃ which projects through an opening 21 formed in the base as a continuation of the narrower rear portion 10ᵃ of the slot 10. The extension 13ᵃ and the opening 21 therefor are clearly shown in Fig. 4. It will be observed that the extension 13ᵃ prevents any accidental withdrawal or displacement of the switching member. In order to additionally hold the said switching member it may be desirable to provide at the rear of the opening 21 a flat spring 22 which is held in notches in the base 5 and which frictionally engages the rear surface of the extension 13ᵃ.

It will be apparent that when the cover 2 is open, the operating member is disengaged from the switching members and either of the latter may be freely removed manually. Thus the circuit can be readily broken between either pair of wire terminals without breaking the circuit between the terminals of the other pair.

As shown the terminals 9 and 9' are connected with service wires S; and the terminals 8 and 8' are connected with wires leading to the meter M. The switching members normally serve to connect the meter with the service wires and to disconnect it therefrom in the usual way by operation of the handle 16ᵃ. It is desirable to provide means after the meter for making and breaking the electrical connection between the meter and the load wires, and insofar as concerns the broader phases of my invention this connecting and disconnecting means after the meter may be widely varied. In Figs. 3 to 6 I have shown this means as consisting of removable links of conventional form.

Mounted on the front of the base 5 are wire terminals 23 and 24 connectible respectively with a wire leading from the meter M and with a load wire L. By means of screws 25 and 26 the terminals 23 and 24 are connected respectively with straps 27 and 28. The said straps are also held by screws 29 and 30 which are so spaced as to be adapted to receive a test link 31 of conventional size and type. When the test link 31 is in place and engaged by nuts on the screws 29 and 30 a connection is established from the terminal 23 to the terminal 24. This connection can be interrupted by loosening the nuts and permitting the link 31 to swing transversely to the position shown by dotted lines in Fig. 5. If preferred the link can be entirely removed.

The screws 11 and 26 which hold the wire terminals 9 and 24 are so spaced as to be adapted to receive a by-pass link A as indicated by dot-and-dash lines in Fig. 5. The screws 11' and 26' holding the terminals 9' and 24' are similarly spaced. The links A are preferably interchangeable with the links 31 and 31'. It will be seen that when the links A are in place by-pass connections are established directly from a service wire S to the corresponding load wire L.

It will be apparent that with the cover closed the appliance shown in Figs. 1 to 6 is adapted to be used as a switch which functions in the ordinary way to make and break the electrical connections between the service wires and the meter. When the cover is open as shown in Figs. 5 and 6 the switching members are free from any connection with the operating member and the device is adapted to serve as a meter test block having all of the features and functions commonly found in such blocks. With the switching members 13—14 and the links 31 in place the normal circuit connections through the meter are maintained. By putting the by-pass links A in place direct connections are obtained from the service wires to the load wires, thus by-passing the meter. Any terminal of the meter can be disconnected from the corresponding service or load wire by removing the corresponding switching member 13—14 or by moving the corresponding link 31.

It will be understood that the several nuts on the screws 11, 12, 25, 29, 30 and 26 are also adapted to serve as test contacts for the attachment of flexible leads extending to a test meter or other meter testing instrumentality. The aforesaid screws are longer than would otherwise be necessary and the projecting forward ends of these screws can be used, if preferred, for holding the clamps that are commonly provided on the flexible leads of testing apparatus.

If service is to be discontinued the switch members 13—14 can be removed and the box can be closed and sealed in the usual way. The operating member is then entirely ineffective for either closing or opening the circuit. Even if the seal were to be broken a person thus obtaining unauthorized access to the interior of the box would have no readily available means for establishing the connections to the meter. When service is to be restored this can be readily done by replacing the switching members.

In Figs. 7 to 11 I have shown an embodiment of the invention which differs from that shown in Figs. 1 to 6 not only in important details of mechanical construction, but also differs in that fuses are provided on the load-side of the meter. The several parts are so related as to incorporate the invention set forth in my said Patent No. 1,301,175.

In this construction there is provided a box 32 having an openable front cover 33. Mounted within the box is an insulating base 34 on which are mounted all of the conducting parts of the appliance. The base is held in place by screws 34ª, 34ª. Mounted on the insulating base 34 are wire terminals 35 and 36 which are connected respectively with stationary switch contacts 37 and 38. The base 34 is provided with a vertical slot 39 which is open at the rear. At the front of the slot 39 is a narrower portion 39ª and the said contacts 37 and 38 are positioned at opposite sides of the slot. The contact 37 is connected with a conducting strap 40 which is located in a slot 41 and is held in place by a screw 42. At its lower end the strap 40 is connected with a strap 43 which extends diagonally forward and then downward as shown in Fig. 8. The terminal 35 is connected to the strap 43 by means of a screw 44. The contact 38 is provided with an offset extension 38ª by which it is directly connected with the terminal 36 by means of a screw 45.

Vertically movable rectilinearly in the slot 39 is a switching member comprising a thin flat plate 46 of insulating material and a conducting element 47 similar to the conducting element 14 already described. The insulating plate extends at the front into the said narrower portion 39ª of the slot 39. When the switching member is in its upper position as shown in Figs. 7, 8 and 10 the conducting element 47 serves to establish electrical connection between the two stationary switch contacts 37 and 38. When the switching member is moved downward from the position shown electrical connection is broken.

Each insulating plate 46 is provided adjacent its upper end with a forward extension 46ª in which is formed a slot 48. The forward end of the extension 46ª is immediately adjacent the cover 33, and when the cover is closed the switching member 46—47 is guided at the front in part by the said cover and in part by the front wall of the slot 39. It is guided at the rear by the rear wall of the box 32.

For operating the switching members there is provided a cranked operating member 49 mounted for movement about a transverse pivotal axis, and the said member is normally so positioned that its cranked portion extends through the slots 48 in the switching members. The said operating member is provided with a handle 49ª located on the exterior of the box and adapted for manual operation to effect movement of the switching members to open or close the circuit.

The operating member 49 instead of being mounted directly upon the side walls of the box 32 is mounted indirectly thereon by means of pivoted bearing plates 50 and 51. These bearing plates are pivoted to the respective side walls of the box for movement about aligned axes at 52 and 53. The trunnions of the operating member are mounted in bearing apertures in the two plates 50 and 51 and they extend through arcuate slots 54 in the side walls of the box. It will be apparent that the bearing plates 50 and 51 together with the operating member 49 are movable about the axes at 52—53, the extent of movement being limited by the ends of the slots 54. When the parts are in their rearmost positions as shown in Figs. 7 to 9 the cranked portion of the operating member 49 is entered in the slots 48. When the cover 33 is closed it engages the front portions of the bearing plates 50 and 51 to hold them against movement in the forward direction. The switching members can then be operated in the usual way by moving the handle 49$^a$. When the handle is in its uppermost position a connection is established between the contacts 37 and 38. When the handle is moved to its lower position the connection is broken.

When the cover 33 is moved to open position as shown in Fig. 11 the operating member 49 may be swung bodily forward within the limits permitted by the slots 54. The bearing plates 50 and 51 correspondingly move to the position shown in Fig. 11. After being moved forward the operating member is swung downward to its lowermost position as shown and it is thus moved out of any engaging or obstructing relationship with the switching members 46—47. Each switching member can then be freely removed manually as shown in Fig. 11.

In the construction shown in Figs. 7 to 11 I have shown fuse contacts on the load side of the meter instead of test links as shown in Figs. 1 to 6. Fuse contacts 55 and 56 are mounted on the front of the base 34 and preferably they are surrounded by a barrier 57 which extends into engagement or substantially into engagement with the front cover 33. This cover is provided with an opening 33$^a$ therein which permits access to the fuse contacts and the fuses. It will be observed that while access can be had to the fuse contacts and fuses with the main cover 33 closed, the said cover prevents access to the switch parts and to all other conducting parts within the box. In order to mechanically protect the fuses and exclude dirt and in order to prevent accidental contact with the fuses or the fuse contacts, the cover 33 may carry a separately movable auxiliary cover 58.

Connected with the fuse contacts 55 and 56 are wire terminals 59 and 60 held in place by screws 61 and 62. Preferably the screws 44 and 62 which hold the wire terminals 35 and 60 are so spaced as to be adapted to receive a by-pass link A of conventional size and type. It will be understood that the link A is held in place by means of nuts on the said screws 44 and 62.

The service wires S are connected with the terminals 35 and 35′ and the terminals 36 and 36′ are connected with wires leading to the meter M. The terminals 59 and 59′ are connected with wires leading from the meter and the terminals 60 and 60′ are connected with load wires L. From the description which has already been given it will be apparent that with the device connected as stated the meter can be connected with or disconnected from the load wires in the usual way by operating the handle 49$^a$.

When the main cover is open the operating member is free to be moved to the position shown in Fig. 11 and when it is in that position the device is adapted to serve as a meter test block in the way already described in connection with Figs. 1 to 6. By-pass links A can be put in place as already described to connect the service wires with the load wires and thus by-pass the meter. Either one of the switching members 46—47 can be removed to disconnect the meter from a service wire and either one of the fuses can be removed to disconnect the meter from a load wire. The nuts on the several screws or the screws themselves serve as test contacts as already described for the attachment of the flexible leads of meter testing apparatus.

Inasmuch as the fuses are accessible through the opening in the front cover without permitting access to any other conducting parts of the appliance, and inasmuch as there are provided meter testing facilities associated with the load side and service side connectible portions of the appliance, it will be apparent that this device is of the type described and claimed in my said Patent No. 1,301,175.

In Figs. 12 to 15 I have shown another embodiment of the invention which differs in many important mechanical details from that shown in Figs. 7 to 10, but which nevertheless constitutes a device of the type set forth in my said Patent No. 1,301,175.

The enclosure for the several parts of the appliance as shown in Figs. 12 to 15 comprises two initially separate boxes 63 and 64 respectively provided with openable front covers 65 and 66. The two boxes are directly and permanently connected with each other in a way to be described in detail. While I have shown two initially separate boxes it will be understood that all of the boxes may if preferred be mounted in a single integral box.

Mounted within the upper box 63 is an insulating base 67 secured to the rear wall of the box 63 by means of screws 67$^a$, 67$^a$. Mounted on the base 67 are two switch contacts 68 and 69 connected to the base by means of screws 70 and 71. These screws also serve for the attachment of wire terminals 72 and 73 which are connected respectively with the said contacts. The contacts extend rearward into a vertical slot 74 in the base, which slot has a narrower rear portion 74ª. Vertically movable in the slot 74 is a switching member comprising a flat plate 75 of insulating material and a conducting element 76 carried by the said plate and adapted to contact with the oppositely facing stationary contacts 68 and 69. It will be understood that when the switching members 75—76 are in the positions shown in Fig. 12 electrical connection is established between the stationary contacts. When the switching members are moved downward from the positions shown the electrical connection is broken.

Mounted in fixed bearing apertures in the side walls of the box 63 is a cranked operating member 77 having an exterior operating handle 77ª. The cranked portion of the operating spindle 77 extends through slots 78 formed in the insulating plates 75. The operating member when moved serves to move the switching members to their circuit making and circuit breaking positions. The front cover 65 of the box serves when closed to guide the switching members at the front thereof, the said members being guided at the rear by the rear walls of the slots 74.

When the cover 65 is open the switching members are no longer held thereby and either of them is free to be first turned in the clockwise direction about the cranked portion of the operating member and then moved downward out of engagement with the said member as clearly shown in Fig. 13.

Mounted in the lower box 64 is an insulating base 79 having fuse contacts 80 and 81 mounted on the front face thereof. These fuse contacts are connected respectively with wire terminals 82 and 83 by means of screws 84 and 85.

The fuses and fuse contacts are readily accessible when the cover 66 of the box 64 is opened. In order to prevent access to other conducting parts within the box 64 there is provided a dead front plate 86 having an opening therein through which the fuses and fuse contacts are exposed. Carried by this dead front plate 86 are small insulating plates 87, 87 which extend into close proximity with the fuse contacts. The top portion of the dead front plate is offset in the forward direction for a reason which will presently be apparent.

The two boxes 63 and 64 are adapted and constructed for direct association and connection with each other and neither of them is intended or adapted for any normal use independently of the other. The upper box 63 has a relatively large opening in the bottom wall thereof and the box 64 has a similar relatively large opening in the top wall thereof.

An insulating connecting member 88 is provided, the main body of this member being positioned between the two boxes. The said member 88 has upward and downward projecting bosses 88ª and 88ᵇ which are adapted to enter and close the openings in the said bottom and top walls of the boxes 63 and 64. Screws 89, 89 extend through the said bottom and top walls and through holes in the body of the insulating element 88, thus serving to rigidly connect the two boxes together. Holes 90, 90 are provided in the insulating member 88 and these holes establish communication between the interiors of the two boxes 63 and 64. Extending through the insulating member 88 is a screw 91 having a wire terminal 92 connected with the upper end portion thereof and having a wire terminal 93 connected with the lower end portion thereof.

Service wires S, S are connected with the terminals 72 and 72' in the upper box 63 and the terminals 73 and 73' are connected with wires leading to the meter M. The wires leading from the meter M are carried through the holes 90, 90 in the insulating element 88 and are connected with the terminals 82, 82'. The terminals 83, 83' are connected directly with the load wires L, L. When there is a third or neutral leg in the circuit the third service wire is connected with the terminal 92 and the third load wire is connected with the terminal 93.

When the appliance is in normal use the upper cover 65 is closed and sealed, but the lower cover 66 is freely openable by the customer. Thus the customer has free access to the fuses and fuse contacts but is prevented from obtaining access to any parts on the load side of the meter, or in fact to any conducting parts whatsoever other than the said fuses and fuse contacts. It will be apparent that the switching unit in the upper box is adapted to serve in the usual way to make and break electrical connection to the meter by operation of the handle 77ª.

When the meter is to be tested both box covers are opened and if desired or found necessary the dead front plate 86 may be removed. With all of the parts thus exposed the appliance is adapted to serve as a meter test block in the way already described.

The arrangement of the parts is such that by-pass links such as A cannot be used, but by-pass connections may be established by means of flexible jumpers extending from the screws 70 and 70' to the screws 84 and 84'. By means of such flexible jumpers connections are established from the service wires to the load wires, thus by-passing the meter. With the meter by-passed the meter terminals can be disconnected from the service wires by removing either one or both of the switching members 75—76. The meter can be connected from either one or both of the load wires by removing either one or both of the fuses.

The construction shown in Figs. 12 to 15 is particularly well adapted for use under conditions where there is a divided responsibility between the public utility company and the contractor or builder with respect to the installation of the meter service equipment, as set forth in my said Patent No. 1,301,175. The inherent advantage of the sectional, although composite unitary structure, is that it makes it possible for the utility company to purchase and install the upper unit with its switching elements therein, this unit providing the required facilities for breaking the electrical connection ahead of the meter either by the operation of the handle 77ª or by the removal of the switching members in the way already described. By reason of the large opening in its bottom wall the upper unit has no intended or normal utility apart from the lower unit with which it is designed to be used.

The contractor or builder can purchase and install the lower unit attaching it to the upper unit which has previously been installed by the utility company. The lower unit can be adapted in the capacity or arrangement of the fuses or otherwise to suit the conditions of the particular installation, which conditions are obviously better known to the contractor than to the utility company. It will be observed, however, that the lower unit like the upper unit has no intended or normal utility except for use with one of the upper units. It is not until the two units are mechanically and electrically connected with each other that either of them attains its full and normal utility. When so connected they serve as a complete meter service installation having all of the functions and advantages which have been described.

What I claim is:

1. In an electric switch, the combination of an enclosing box, an operating member partly within the box and comprising a handle on the exterior thereof, a plurality of stationary switch contacts in the box, a plurality of movable switching members in the box for making and breaking electrical connection with the respective contacts, the said switching members being normally in operative relationship with the operating member and the said switching members when accessible being freely movable manually independently of the operating member and independently of each other to break the connections with the respective contacts, and an openable front cover for the box serving when closed to prevent access to the switching members and also serving when closed to maintain the said operative relationship between the operating member and the switching members.

2. In an electric switch, the combination of an enclosing box, an operating member partly within the box and comprising a handle on the exterior thereof, a stationary switch contact in the box, a movable switching member in the box for making and breaking electrical connection with the contact, the said switching member being normally in operative relationship with the operating member and the said switching member when accessible being freely movable manually so as to be disengaged and completely separated from the other parts of the switch to break the connection with the said contact, and an openable front cover for the box serving when closed to prevent access to the switching member and also serving when closed to maintain the said operative relationship between the operating member and the switching member.

3. In an electric switch, the combination of an enclosing box, an openable front cover for the box, an operating member partly within the box and comprising a handle on the exterior thereof, a stationary switch contact in the box, and a movable switching member in the box for making and breaking electrical connection with the contact, the said switching member when the cover is closed being directly engaged thereby and thus held in operative relationship with the operating member and the said switching member when the cover is open being freely movable manually independently of the operating member to break the connection with the contact.

4. In an electric switch, the combination of an enclosing box, an openable front cover for the box, an operating member partly within the box and comprising a handle on the exterior thereof, two stationary switch contacts in the box, and a movable switching member in the box for making and breaking electrical connection between the contacts, the said switching member when the cover is closed being guided in part thereby for rectilinear movement and being held thereby in operative relationship with the operating member and the said switching member when the cover is open being entirely free to be manipulated independently of the operating member so as to be completely separated and removed from the other parts of the switch.

5. In an electric switch, the combination of an enclosing box including an openable front cover, an operating member partly within the box and comprising a handle on the exterior thereof, two pairs of stationary switch contacts in the box, and two separate switching members rectilinearly movable within the box for making and breaking electrical connection with the contacts of the respective pairs, at least one of the switching members when the cover is closed being engaged by the operating member to be moved thereby to make and break electrical connection and at least one of the switching members when the cover is open being freely movable manually independently of any other switching member and independently of the operating member to make and break electrical connection.

6. An electric switch as set forth in claim 4, wherein the operating member is at the front of the switching member and wherein the switching member is formed with a slot open at the front and adapted for receiving the operating member.

7. In an electric switch, the combination of an enclosing box, an operating member normally partly within the box and comprising a handle on the exterior thereof, the said operating member being bodily movable from its normal position, an openable front cover for the box serving when closed to prevent the aforesaid bodily movement of the operating member, a plurality of pairs of stationary switch contacts in the box, and a plurality of movable switching members in the box for making and breaking electrical connection between the contacts of the respective pairs, the said switching members being in operative relationship with the operating member when the said operating member is in its normal position and the said switching members being freely movable manually independently of the operating member and independently of each other to break the connection between the contacts of the respective pairs when the said operating member is in its forward position.

8. In an electric switch, the combination of an enclosing box, an operating member normally partly within the box and comprising a handle on the exterior thereof, the said operating member being bodily movable from its normal position, an openable front cover for the box serving when closed to prevent the aforesaid bodily movement of the operating member, two stationary switch contacts in the box, and a movable switching member in the box for making and breaking electrical connection between the contacts, the said switching member being in operative relationship with the operating member when the said operating member is in its normal position and the said switching member being freely movable manually so as to be disengaged and completely separated from the other parts of the switch to break the connection between the contacts when the said operating member is out of its normal position.

9. In an electric switch, the combination of an enclosing box, an operating member normally partly within the box and comprising a handle on the exterior thereof, the said operating member being bodily movable from its normal position, an openable front cover for the box serving when closed to prevent the aforesaid bodily movement of the operating member, two stationary switch contacts in the box, and a movable switching member in the box normally directly engaged by the cover and thereby held in its normal path of movement and in operative relationship with the operating member, the said switching member serving to make and break electrical connection between the contacts and being manually movable independently of the operating member to make or break such connection when the said operating member is out of its normal position.

10. In an electric switch, the combination of an enclosing box, an openable front cover for the box, an operating member partly within the box and comprising a handle on the exterior thereof, an insulating base in the box, two stationary switch contacts on the base at the front thereof, and a rectilinearly movable switching member guided by the base at the front thereof for making and breaking electrical connection between the contacts, the said switching member when the cover is closed being directly engaged and guided thereby and thus held in operative relationship with the operating member and the said switching member when the cover is open being free to be manually disengaged and completely separated from the other parts of the switch.

11. In an electric switch, the combination of an enclosing box, an openable front cover for the box, an operating member carried by the cover at the inner side thereof and comprising a handle on the exterior of the box, a plurality of stationary switch contacts in the box, and a plurality of movable switching members in the box for making and breaking electrical connection with the respective contacts, the said switching members when the cover is closed being in operative relationship with the operating member for movement thereby and the said switching members when the cover is open being freely movable manually independently of the operating member and independently of each other to break the connections with the respective contacts.

12. In an electric switch, the combination of an enclosing box, an openable front cover for the box, an operating member carried by the cover at the inner side thereof and comprising a handle on the exterior of the box, a stationary switch contact in the box, and a movable switching member in the box for making and breaking electrical connection with the contact, the said switching member when the cover is closed being in operative relationship with the operating member for movement thereby and the said switching member when the cover is open being freely movable manually so as to be disengaged and completely separated from the other parts of the switch to break the connection with the stationary contact.

13. In an electric switch, the combination of an enclosing box, an openable front cover for the box, an operating member carried by the cover at the inner side thereof and comprising a handle on the exterior of the box, two stationary switch contacts in the box, and a movable switching member in the box for making and breaking electrical connection between the contacts, the said switching member when the cover is closed being guided in part thereby for rectilinear movement and the said switching member when the cover is open being entirely free to be manipulated independently of the operating member so as to be completely separated and removed from the other parts of the switch.

14. In an electric switch, the combination of an enclosing box, an openable front cover for the box, an operating member carried by the cover at the inner side thereof and comprising a handle on the exterior of the box, an insulating base in the box, two stationary switch contacts on the base at the front thereof, and a rectilinearly movable switching member guided by the base at the front thereof for making and breaking electrical connection between the contacts, the said switching member when the cover is closed being directly engaged and guided thereby and being in operative relationship with the operating member and the said switching member when the cover is open being free to be manually disengaged from the base and completely separated and removed from the other parts of the switch.

15. In an electric switch, the combination of an enclosing box, an openable front cover for the box, an operating member carried by the cover at the inner side thereof and comprising a handle on the exterior of the box, an insulating base in the box having a vertical slot at the front, the bottom end of the slot being closed at the front and having an opening at the rear, two stationary switch contacts on the base adjacent opposite sides of the slot, and a rectilinearly movable switching member comprising a conducting element for making and breaking electrical connection between the contacts and also comprising a flat insulating element carrying the conducting element and having a projection adapted to enter the opening at the bottom end of the slot when the switching member is in circuit breaking position, the said switching member when the cover is closed being directly engaged and guided thereby and being in operative relationship with the operating member and the said switching member when the cover is open being free to be manually disengaged and completely separated from the other parts of the switch.

16. In an electric switch, the combination of an enclosing box, an operating member bodily movable from its normal position and comprising a handle on the exterior of the box, a front cover for the box openable independently of the operating member but serving when closed to hold the said member in its normal position, a stationary switch contact in the box, and a movable switching member in the box for making and breaking electrical connection with the contact, the said switching member being in operative relationship with the operating member when the operating member is in its normal position and the said switching member being freely movable manually independently of the operating member to break the connection with the contact when the operating member is in its forward position.

17. An electric switch as set forth in claim 16, wherein when the cover is open the said switching member is entirely free to be manipulated independently of the operating member so as to be completely separated and removed from the other parts of the switch.

18. In an electric switch, the combination of an enclosing box, an operating member bodily movable forward from its normal position and comprising a handle on the exterior of the box, supporting means for the operating member movably connected with the box, a front cover for the box openable independently of the operating member and its supporting means but serving when closed to directly engage the supporting means and thereby hold the said member in its normal position, a stationary switch contact in the box, and a movable switching member in the box for making and breaking electrical connection with the contact, the said switching member being in operative relationship with the operating member when the operating member is in its normal position and the said switching member being freely movable manually independently of the operating member to break the connection from the contact when the operating member is in its forward position.

19. In an electric switch, the combination of an enclosing box, a cranked operating member extending across the box and through slots in the side walls thereof, and comprising a handle on the exterior of the box, two supports pivotally mounted respectively on the box side walls adjacent the slots and serving to pivotally support the operating member, a front cover for the box openable independently of the operating member and its supports but serving when closed to directly engage the supports and thereby hold the said member in its rearmost or normal position, a stationary switch contact in the box, and a movable switching member in the box for making and breaking electrical connection with the contact, the said switching member being in operative relationship with the operating member when the operating member is in its normal position and the said switching member being freely movable manually independently of the operating member to break the connection from the contact when the operating member is in its forward position.

20. In an electric switch, the combination of an enclosing box, an operating member normally partly within the box and comprising a handle on the exterior thereof, the said operating member being bodily movable forward from its normal position, an openable front cover for the box serving when closed to prevent the aforesaid forward movement of the operating member, an insulating base in the box, two stationary switch contacts on the base adjacent the rear thereof, and a rectilinearly movable switching member guided by the base adjacent the rear thereof for making and breaking electrical connection between the contacts, the said switching member having a forward extension which is in operative relationship with the operating member when the operating member is in its normal position and the said switching member being free to be manually disengaged and completely separated from the other parts of the switch when the cover is open and the operating member is in its forward position.

21. In an electric switch, the combination of an enclosing box, an openable front cover for the box, a cranked operating member pivotally mounted for movement about a fixed transverse axis and comprising a handle on the exterior of the box, an insulating base in the box, two stationary switch contacts on the base at the front thereof, and a movable switching member for making and breaking electrical connection between the contacts, the said switching member when the cover is closed being directly engaged thereby and thus held in operative relationship with the cranked portion of the operating member and the said switching member when the cover is open being free to be manually disengaged from the operating member and moved independently thereof to break the connection between the contacts.

22. In an electric switch, the combination of an enclosing box, an openable front cover for the box, a cranked operating member pivotally mounted for movement about a fixed transverse axis, and comprising a handle on the exterior of the box, an insulating base in the box, two stationary switch contacts on the base at the front thereof, and a rectilinearly movable switching member guided by the base at the front thereof for making and breaking electrical connection between the contacts, the said switching member when the cover is closed being directly engaged and guided thereby and thus held in operative relationship with the cranked portion of the operating member and the said switching member when the cover is open being free to be manually disengaged and completely separated from the operating member and the base.

23. In an electric switch, the combination of an enclosing box, an openable front cover for the box, a cranked operating member pivotally mounted for movement about a fixed transverse axis and comprising a handle on the exterior of the box, an insulating base in the box, two stationary switch contacts on the base at the front thereof, and a rectilinearly movable switching member guided by the base at the front thereof for making and breaking electrical connection between the contacts, the said switching member when the cover is closed being directly engaged and guided thereby and thus held in operative relationship with the cranked portion of the operating member and the said switching member when the cover is open being free to be manually turned about the cranked portion of the operating member and then entirely separated therefrom.

24. In an electric meter service appliance, the combination of an enclosure, an operating member partly within the enclosure and comprising a handle on the exterior thereof, a pair of stationary switch contacts in the enclosure, a pair of wire terminals respectively connected with the said contacts, one terminal being connectible with a service wire and the other terminal being connectible with a wire leading to a meter, a movable switching member in the enclosure for making and breaking electrical connection between the contacts, the switching member being normally in operative relationship with the operating member and being adapted to be disengaged therefrom and completely separated from all other parts of the appliance thus breaking the connection between the corresponding contacts, another pair of contacts within the enclosure, another pair of wire terminals respectively connected with the last said contacts, one terminal being connectible with a wire leading from a meter and the other terminal being connectible with a load wire, and a connector normally engaging the last said contacts and manually movable to break the said connection between them.

25. In an electric meter service appliance, the combination of an enclosure, an operating member partly within the enclosure and comprising a handle on the exterior thereof, two pairs of stationary switch contacts in the enclosure, two pairs of wire terminals respectively connected with the said contacts, one terminal of each pair being connectible with a service wire and the other terminal of each pair being connectible with a wire leading to a meter, two movable switching members in the enclosure for making and breaking electrical connection between the contacts of the respective pairs, each switching member being normally in operative relationship with the operating member and being adapted to be independently disengaged therefrom and completely separated from all other parts of the appliance thus breaking the connection between the corresponding contacts, two other pairs of contacts within the enclosure, two other pairs of wire terminals respectively connected with the last said contacts, one terminal of each pair being connectible with a wire leading from a meter and the other terminal of each pair being connectible with a load wire, and two connectors normally engaging the contacts of the last said pairs and manually movable independently of each other to break the said connections between them.

26. An electric meter service appliance as set forth in claim 25, wherein the last said pairs of contacts are fuse contacts and the connectors therefor are fuses, and wherein there is a front cover means for the enclosure serving when closed to permit access to the said fuse contacts and fuses and to prevent access to any other conducting parts within the enclosure.

27. In an electric meter service appliance, the combination of an enclosure, an openable front cover for at least a portion of the enclosure, an operating member partly within the enclosure and comprising a handle on the exterior thereof, two pairs of stationary switch contacts in the enclosure, two pairs of wire terminals respectively connected with the said contacts, one terminal of each pair being connectible with a service wire and the other terminal of each pair being connectible with a wire leading to a meter, two movable switching members in the enclosure for making and breaking electrical connection between the contacts of the respective pairs, the said switching members when the cover is closed being directly engaged and thus held and the said switching members when the cover is open being freely movable manually independently of the operating member and of each other to break the connection between the corresponding contacts, two other pairs of contacts within the enclosure, two other pairs of wire terminals respectively connected with the last said contacts, one terminal of each pair being connectible with a wire leading from a meter and the other terminal of each pair being connectible with a load wire, and two connectors normally engaging the contacts of the last said pairs and manually movable independently of each other to break the said connections between them.

In testimony whereof I have hereunto set my hand this 28th day of March, 1932.

JOSEPH SACHS.